Patented Feb. 23, 1943

2,311,781

UNITED STATES PATENT OFFICE 2,311,781

SYNTHETIC RESIN AND PROCESS OF PRODUCING THE SAME

Paul H. Scrutchfield, Chester, Va., assignor to Hercules Powder Company, Wilmington, Del., a corporation of Delaware No Drawing. Application October 3, 1941, Serial No. 413,480

16 Claims. (Cl. 260—101)

This invention relates to synthetic resins and the process of making the same and more particularly it relates to the production of a rosin-formaldehyde-maleic anhydride conjoint condensate.

It has heretofore been proposed to react rosin with formaldehyde. For example, the use of inorganic and of saturated organic acids as a catalyst for such a reaction has been described. However, the product of this reaction has a melting point not much higher than the original rosin and therefore has attained little economic importance. It has further been proposed to react rosin with maleic anhydride. The products of this reaction are of higher melting point than the original rosin but although the reaction improves the properties of the rosin in some respects, the use of relatively large amounts of comparatively expensive maleic anhydride increases the cost excessively. Moreover, the acid number of the products is much greater than that of the original rosin so that an excessive amount of alcohol is required to esterify the product to the desired low acid number.

Now in accordance with this invention, it has been found that improved types of synthetic resins employing rosin or the like as a basis are produced by conjointly condensing an unsaturated rosin acid such as rosin or an ester of an unsaturated rosin acid with formaldehyde or other reactive aldehyde and with maleic anhydride or other alpha beta unsaturated polycarboxylic acid. For example, it has been found that the melting point of rosin may be increased by condensation with both formaldehyde and maleic anhydride to an extent substantially greater than the combined increases which would be imparted to the rosin by the use of formaldehyde and maleic anhydride separately. The more than additive increase in melting point of the rosin is wholly unexpected and gives rise to numerous advantages. Since both the formaldehyde and maleic anhydride in combining with the rosin separately react with the double bonds in the rosin, it would not be expected that simultaneous reaction of both would give an increase in melting point greater than the additive separate increases. Accordingly, the present invention enables the production of a high melting point synthetic resin from rosin which is normally considered to have an objectionably low melting point, by the use of smaller amounts of relatively expensive maleic anhydride than have heretofore been employed.

While it is not intended to limit the invention to any particular theory of operation, it is believed that the maleic acid or anhydride acts both as a catalyst for the reaction between rosin and formaldehyde, causing the formaldehyde to react with the rosin in such manner as to form esterifiable hydroxyl groups, and also as a reactant which condenses with the rosin forming a tribasic acid which reacts with the hydroxyl groups, which reactants also esterifies the hydroxyl groups introduced by the formaldehyde giving a very complex compact molecule of high melting point.

The product obtained when a rosin acid is used as the raw material may be reacted further with a polyhydric alcohol such as for example, glycerin, pentaerythritol, etc., to yield a still more complex resin which is especially adapted to use in the synthetic resin field. If desired, a similar, although not necessarily identical result may be obtained by using an ester of rosin as the initial rosinyl compound. For example, the condensation of the methyl, ethyl, or glycerin ester of an unsaturated rosin acid with formaldehyde and maleic anhydride or their equivalents yields a resin of high melting point which is very satisfactory for use in the formulation of coating compositions.

As the aldehyde, it is preferred to use formaldehyde. This is preferably employed in the form of the aqueous solution known as formalin. Instead of formaldehyde, paraformaldehyde may be used with equal results. Other aldehydes such as acetaldehyde, aldols, propionaldehyde, butyraldehyde, acrolein, crotonaldehyde, benzaldehyde, furfural, etc., may be employed.

As the initial unsaturated rosinyl compound, there may be utilized ordinary rosin such as wood or gum rosin, abietic acid, Steele's acid, crystalline abietic acid, polymerized rosin which may be considered to comprise a mixture of ordinary rosin and the dimer of rosin in varying amounts, the resinous material known in the art as tall oil which contains rosin or abietic acid and other resin acids analogous to abietic acid, etc. The product of the present invention prepared with crystalline abietic acid has paler color than a corresponding product prepared with rosin itself and is therefore preferred for many purposes. The condensate made with crystalline abietic acid upon esterification with a polyhydric alcohol such as glycerin yields an ester having an even higher melting point than a corresponding condensate made with rosin. Likewise, the product made with polymerized rosin is characterized by its relatively high melting point which renders it more suitable for many purposes since high melting point is a desideratum in many fields of synthetic resin application. Instead of using the unsaturated rosin acids, esters thereof may be used, such as for example, the polyhydric alcohol esters thereof such as ester gum, the monohydric alcohol esters thereof such as methyl abietate, etc.

As the unsaturated alpha beta polycarboxylic acid, I prefer to use maleic anhydride. Instead of using the anhydride, I may use maleic acid itself though less preferably. Other alpha beta unsaturated polycarboxylic acids such as fumaric, etc., and their anhydrides may be used.

The proportions employed may vary within quite wide limits. For example, there may be utilized from about 1 to about 5 mols of the aldehyde such as formaldehyde per mol of unsaturated rosin acid such as rosin or polymerized rosin. Where a rosin ester containing more than 1 rosin group per mol is used, such as for example, ester gum which contains 3 rosin nuclei, ⅓ of a mol of which presents 1 mol of rosin acid nuclei, proportionately less of the ester would be used on a molal basis than of rosin. The amount of unsaturated alpha beta polycarboxylic acid such as maleic anhydride may vary between limits corresponding to from about 1% to about 33% and preferably from about 1% to about 15% by weight of maleic anhydride based on the combined weight of the rosinyl compound and the aldehyde.

Generally, the rosin acid-aldehyde-maleic anhydride condensate will be prepared using from about 1 to about 4 mols of aldehyde per mol of unsaturated rosin acid, effecting condensation in the presence of from about 0.03 to about 1 mol of maleic anhydride per mol of unsaturated rosin acid. Preferably, the proportions used are from about 1 to about 2 mols of aldehyde and from about 0.03 to about 0.5 mol of maleic anhydride per mol of unsaturated rosin acid.

The selection of proportions to be used within the foregoing ranges will depend upon the cost, melting point and other properties desired in the product.

The reaction is preferably carried out by commingling the three ingredients at an elevated temperature for a sufficient period of time to bring about substantially a maximum increase in melting point. For example, it has been found convenient to reflux a solution of the rosinyl compound such as rosin or polymerized rosin or esters thereof in a volatile organic solvent, such as benzene and of a 30% to 60% concentration, with aqueous formalin and with maleic anhydride for from about 1 to about 24 hours and preferably from about 2 to about 8 hours, the mixture then being evaporated and the condensate finally heated to a temperature ranging from about 100° C. to about 290° C., preferably under vacuum to remove water, solvent, and unreacted maleic acid or anhydride. Where paraformaldehyde is used, there may be refluxed a solution of rosinyl compound in benzene or other solvent with the paraformaldehyde and the maleic anhydride after which the solvent, water and any excess maleic anhydride are removed, as for example, by distillation followed by final heating to say 240° C. under 15 mm. pressure.

For the final removal of water, solvent and unreacted maleic anhydride, it is preferred to use a temperature ranging from about 200° C. to about 240° C. and a vacuum corresponding to 15 mm. absolute pressure.

Preferably the reactants employed consist essentially of the unsaturated rosinyl compound, the aldehyde and the unsaturated polybasic acid, no other reactants being employed in significant or substantial amounts.

The following examples illustrate typical non-limiting embodiments of the preferred practice of the invention. In each of Examples 1 to 9, the rosin was dissolved in benzene to form a 30% solution, the indicated amount of formaldehyde in the form of the 35.6% aqueous solution known as formalin, and the maleic anhydride added, the mixture refluxed at 80 to 90° C. for about 7 hours, and then heated to about 240° C. at 15 mm. pressure to remove volatiles.

*Example 1*

| | Parts by weight |
|---|---|
| N wood rosin | 100 |
| HCHO | 9.38 |
| Maleic anhydride | 10.9 |

The product analyzed: acid number 176; saponification number 217; and drop melting point 140° C. A corresponding product made by the same procedure except that the formaldehyde was omitted analyzed: acid number 208; saponification number 233; and drop melting point 102° C.

*Examples 2 to 9*

| Ex. No. | Mols of N wood rosin | Mols of HCHO | Per cent of maleic anhydride based on the combined weight of rosin and HCHO | Per cent yield | D.M.P. ° C. | D.M.P.° C. of glyceride |
|---|---|---|---|---|---|---|
| 2 | 1 | 0.1 | 1.22 | 99.4 | 93 | 100 |
| 3 | 1 | 1.0 | 5 | 95 | 118 | 135 |
| 4 | 1 | 1.0 | 6.86 | 95.3 | 120 | 159 |
| 5 | 1 | 1.0 | 10 | 95.3 | 140 | 178+ |
| 6 | 1 | 2.0 | 5 | 90 | 133 | 148 |
| 7 | 1 | 2.0 | 10 | 89.5 | 146 | 192+ |
| 8 | 1 | 2.0 | 20 | 88.5 | 163 | Gel |
| 9 | 1 | 4.0 | 32.3 | 75 | 175 | |

In order to illustrate the effect of the conjoint use of rosin, formaldehyde and maleic anhydride, it may be stated that the product of Example 4 using only 6.86 parts of maleic anhydride per 100 parts of combined rosin and HCHO gave a glyceride which was equivalent in melting point to the glyceride of the product obtained from the condensation of 13.5 parts of maleic anhydride with 100 parts of N wood rosin.

*Example 10*

| | Parts by weight |
|---|---|
| N wood rosin | 800 |
| Formaldehyde (as 35.6% formalin) | 75 |
| Maleic anhydride | 43.75 |

The rosin was dissolved to 60% solids in benzene. To this solution was added the aqueous formaldehyde and the maleic anhydride. The emulsion so formed was vigorously agitated and refluxed for 5 to 7 hours at 75° to 85° C. The volatile components were then distilled off and the resulting condensate heated to 240° C. and held there for 30 minutes at 15 mm. The resin was poured and cooled to room temperature. A hard, brittle, amber colored condensate was obtained analyzing:

Drop melting point (Hercules method) °C.. 120
Acid number ........................ 160
Color ............................... I

Example 11

| | Parts by weight |
|---|---|
| Polymerized wood rosin | 800 |
| (H₂SO₄ polymerized, drop melting point 98° C.) | |
| Formalin (as 35.6% formalin) | 75 |
| Maleic anhydride | 43.75 |

These ingredients were reacted exactly as in Example 10. The condensate analyzed:

Drop melting point ................ °C.. 135
Acid number ........................ 161
Color ............................... I

Example 12

| | Parts by weight |
|---|---|
| N wood rosin | 800 |
| Formaldehyde (as 35.6% formalin) | 150 |
| Maleic anhydride | 47.5 |

The rosin was dissolved to 60% solids in benzene. The formaldehyde and maleic anhydride were added. The mixture was agitated vigorously and refluxed at 75–85° C. for 6 hours. The volatile components of the reaction mixture were distilled off, the condensate which was obtained heated to 240° C. and held there for 30 minutes at 15 mm. On pouring and cooling, there was obtained a hard, brittle condensate which analyzed:

Drop melting point ................ °C.. 132
Acid number ........................ 150
Color ............................... I to G

Example 13

| | Parts by weight |
|---|---|
| N wood rosin | 1,500 |
| Formaldehyde (as 35.6% formalin) | 422 |
| Maleic anhydride | 96 |

A mixture of a 60% solution of the rosin in benzene, the formalin and the maleic anhydride was refluxed at 75 to 85° C. for approximately 3 hours. After distillation of the volatile components, the condensate obtained was raised to 240° C. and held there at 15 mm. for 30 minutes. The resulting condensate analyzed:

Drop melting point ................ °C.. 159
Acid number ........................ 147
Color ............................... G

Example 14

| | Parts by weight |
|---|---|
| N wood rosin | 1,800 |
| Crotonaldehyde | 169 |
| Maleic anhydride | 108 |

A mixture of a 60% solution of the rosin in benzene, the crotonaldehyde, and the maleic anhydride was heated to 75° C. for about 7 hours. After distillation of the volatile components, the condensate obtained was heated to 240° C. and held at this temperature under reduced pressure (15 mm.) for 30 minutes. On cooling a hard, brittle resin was obtained having the following analysis:

Melting point ..................... °C.. 125
Acid number ........................ 157
Color ............................... I

Example 15

A condensate was prepared as in Example 10, using the following ratios of reacting ingredients:

| | Parts by weight | Relative molar amounts |
|---|---|---|
| N wood rosin | 320 | 1 |
| Formaldehyde (as 35.6% formalin) | 60 | 2 |
| Maleic anhydride | 75 | 0.75 |

Example 16

| | Parts by weight |
|---|---|
| Crystalline abietic acid | 500 |
| Formaldehyde (as 35.6% formalin) | 50 |
| Maleic anhydride | 30 |

The crystalline abietic acid was obtained by crystallization from a saturated solution of N wood rosin in ethyl alcohol. This crytalline abietic acid was dissolved to 50% solids in benzene. To this solution, the maleic anhydride and formalin were added. The mixture was refluxed for 7 hours at 75° C. The volatile components were then distilled. The condensate obtained was heated to 240° C. and held at this temperature under reduced pressure of 15 mm. for 30 minutes. On pouring, a hard, brittle resin was obtained analyzing as follows:

Acid number ........................ 168
Drop melting point ................ °C.. 132
Color ......................Amber (N).. 29

A comparative resin prepared using N wood rosin in place of the crystalline abietic acid produced a condensate having the following analysis:

Drop melting point ................ °C.. 135
Acid number ........................ 161
Color ..................Amber+0.5 Red.. 80

The foregoing results show that the use of crystalline abietic acid in place of rosin gives a condensate having improved color.

The condensate prepared in accordance with this example with crystalline abietic acid was esterified with glycerin, using 11 parts of glycerin per 100 parts of condensate. The resulting ester analyzed:

Drop melting point ................. °C.. 157
Acid number ........................ 10
Color ............................Amber.. 35

A corresponding ester prepared from the condensate made with rosin for comparative purposes in accordance with the procedure of this example analyzed:

Acid number ........................ 10.5
Color ............................Amber.. 47
Melting point ..................... °C.. 144

The results just set forth show that the use of a condensate prepared with crystalline abietic acid yields esters of improved color and melting point as compared to the esters of a similar condensate prepared from rosin.

Example 17

| | Parts by weight |
|---|---|
| N wood rosin | 160 |
| Paraformaldehyde | 15 |
| Maleic acid | 13.5 |

These constituents were reacted in the manner of the foregoing Example 16. The product had an acid number of 161 and a melting point of 126° C.

Example 18

| | Parts by weight |
|---|---|
| N wood rosin | 160 |
| Paraformaldehyde | 15 |
| Fumaric acid | 13.5 |

These ingredients were reacted in the same manner as in Example 16. The condensate had an acid number of 207 and a melting point of 114° C.

Example 19

| | Parts by weight |
|---|---|
| Gum rosin | 160 |
| Paraformaldehyde | 15 |
| Maleic anhydride | 8.75 |

These ingredients were reacted as in Example 16. The product had an acid number of 165 and a melting point of 125° C.

Example 20

| | Parts by weight |
|---|---|
| Polymerized rosin (melting point 98° C.) | 160 |
| Paraformaldehyde | 15 |
| Maleic anhydride | 8.75 |

Upon reaction in the same manner as in Example 16 there was obtained a condensate having an acid number of 160 and a drop melting point of 132° C.

Example 21

| | Parts by weight |
|---|---|
| Ester gum | 160 |
| Paraformaldehyde | 15 |
| Maleic anhydride | 8.75 |

These ingredients were reacted in the same manner as in Example 16. The condensate had an acid number of 25 and a drop melting point of 135° C.

Example 22

| | Parts by weight |
|---|---|
| Methyl abietate | 830 |
| Formaldehyde (35.6% solution) | 209 |
| Maleic anhydride | 45 |

These ingredients were reacted in the same manner as in Example 16. The yield of the condensate was 894.9 parts by weight.

Example 23

| | Parts by weight |
|---|---|
| Steele's abietic acid | 160 |
| Paraformaldehyde | 30 |
| Maleic anhydride | 9.5 |

These ingredients were reacted as in Example 16. The yield was 175 parts by weight of the condensate.

Example 24

| | Parts by weight |
|---|---|
| Tall oil | 500 |
| Paraformaldehyde | 135 |
| Maleic anhydride | 27.5 |

These ingredients were reacted in the same manner as in Example 16. The yield was 536.2 parts by weight of the condensate.

Example 25

| | Parts by weight |
|---|---|
| N wood rosin | 100 |
| Formaldehyde (as 35.6% formalin) | 9.38 |
| Maleic anhydride | 7 |

These ingredients were reacted in the same manner as in Example 16.

The condensation products of the unsaturated rosin acid with an aldehyde and with an alpha beta unsaturated acid may be neutralized with bases, alkaline salts, alkyl or alkylol amines or with aromatic bases and may be partially or completely esterified if desired.

The condensation products of the present invention are characterized in addition to their high melting point and the high melting point of their esters, by their low acid number which is much lower than would be obtained by the reaction of the maleic anhydride employed by itself with the unsaturated rosinyl compound. For example, if from the formulations of the present invention the formaldehyde or other aldehyde be omitted, the reaction between the unsaturated rosinyl compound and the maleic anhydride results in the production of an adduct which has an objectionably high acid number. The low acid number which results from introducing an aldehyde into the formulation in accordance with the present invention is most advantageous.

The products of the present invention are very advantageous for use wherever their properties adapt them to replace hitherto used alkyd resins. Thus, they may be used in the formulation of varnishes, coating compositions generally, impregnating compositions, plastic compositions, and the like. In view of their low cost, their high melting point, and their other desirable properties, their wide adoption and use is indicated.

What I claim and desire to protect by Letters Patent is:

1. As a new article of manufacture, a conjoint condensation product of the simultaneous reaction of a mixture of reactants which consist essentially of an unsaturated rosinyl compound, selected from the group consisting of unsaturated rosin acids and esters thereof, an aldehyde, and an alpha beta unsaturated polycarboxylic acid.

2. As a new article of manufacture, a conjoint condensation product of the simultaneous reaction of a mixture of reactants which consist essentially of an unsaturated rosinyl compound, selected from the group consisting of unsaturated rosin acids and esters thereof, formaldehyde, and maleic anhydride.

3. As a new article of manufacture, a conjoint condensation product of the simultaneous reaction of a mixture of reactants which consist essentially of rosin, formaldehyde, and maleic anhydride.

4. As a new article of manufacture, a conjoint condensation product of the simultaneous reaction of a mixture of reactants which consist essentially of polymerized rosin, formaldehyde, and maleic anhydride.

5. As a new article of manufacture, a conjoint condensation product of the simultaneous reaction of a mixture of reactants which consist essentially of crystalline abietic acid, an aldehyde, and an alpha beta unsaturated polycarboxylic acid.

6. As a new article of manufacture, a conjoint condensation product of the simultaneous reaction of a mixture of reactants which consist essentially of an ester of an unsaturated rosin acid, an aldehyde, and an alpha beta unsaturated polycarboxylic acid.

7. As a new article of manufacture, a conjoint condensation product of the simultaneous reaction of a mixture of reactants which consist essentially of an unsaturated rosinyl compound, selected from the group consisting of unsaturated rosin acids and esters thereof, formaldehyde, and maleic anhydride, the proportions being from about 1 to about 5 mols of said formaldehyde per mol of rosin acid nuclei contained in said unsaturated rosinyl compound, and from about 1% to about 33% by weight of said maleic anhydride based on the combined weight of said rosinyl compound and said formaldehyde.

8. As a new article of manufacture, a conjoint condensation product of the simultaneous reaction of a mixture of reactants which consist essentially of an unsaturated rosinyl compound, selected from the group consisting of unsaturated rosin acids and esters thereof, an aldehyde, and an alpha beta unsaturated polycarboxylic acid, the proportions being from about 1 to about 5 mols of said aldehyde per mol of rosin acid nuclei contained in said unsaturated rosinyl compound, and from about 1% to about 15% by weight of said acid based on the combined weight of said rosinyl compound and said aldehyde.

9. As a new article of manufacture, a conjoint condensation product of the simultaneous reaction of a mixture of reactants which consist essentially of rosin, formaldehyde, and maleic anhydride, the proportions being from about 1 to about 5 mols of said formaldehyde per mol of said rosin, and from about 1% to about 15% by weight of said maleic anhydride based on the combined weight of said rosin and said formaldehyde.

10. As a new article of manufacture, a conjoint condensation product of the simultaneous reaction of a mixture of reactants which consist essentially of polymerized rosin, an aldehyde, and an alpha beta unsaturated polycarboxylic acid, the proportions being from about 1 to about 5 mols of said aldehyde per mol of said polymerized rosin, and from about 1% to about 15% by weight of said acid based on the combined weight of said polymerized rosin and said aldehyde.

11. As a new article of manufacture, a conjoint condensation product of the simultaneous reaction of a mixture of reactants which consist essentially of polymerized rosin, formaldehyde, and maleic anhydride, the proportions being from about 1 to about 5 mols of said formaldehyde per mol of said polymerized rosin, and from about 1% to about 15% by weight of said maleic anhydride based on the combined weight of said polymerized rosin and said formaldehyde.

12. As a new article of manufacture, a conjoint condensation product of the simultaneous reaction of a mixture of reactants which consist essentially of crystalline abietic acid, formaldehyde, and maleic anhydride, the proportions being from about 1 to about 5 mols of said formaldehyde per mol of said abietic acid, and from about 1% to about 15% by weight of said maleic anhydride based on the combined weight of said abietic acid and said formaldehyde.

13. The process which comprises reacting simultaneously at a temperature within the range from about 100 to about 290° C. a mixture of reactants which consist essentially of an unsaturated rosinyl compound, selected from the group consisting of unsaturated rosin acids and esters thereof, with an aldehyde and an alpha beta unsaturated polycarboxylic acid, the proportions being from about 1 to about 5 mols of aldehyde per mol of rosin acid nuclei contained in said unsaturated rosinyl compound and from about 1 to about 33% by weight of said alpha beta unsaturated polycarboxylic acid based on the combined weight of said rosinyl compound and said aldehyde.

14. The process which comprises reacting simultaneously at a temperature within the range from about 100 to about 290° C. a mixture of reactants which consist essentially of an unsaturated rosinyl compound, selected from the group consisting of unsaturated rosin acids and esters thereof, with formaldehyde and with maleic anhydride, the proportions being from about 1 to about 5 mols of formaldehyde per mol of rosin acid nuclei contained in said unsaturated rosinyl compound and from about 1% to about 33% by weight of said maleic anhydride based on the combined weight of said rosinyl compound and said formaldehyde.

15. The process which comprises refluxing for from about 2 to about 8 hours a mixture consisting essentially of a solution of rosin in a volatile organic solvent, aqueous formalin, and maleic anhydride, the proportions being from about 1 to about 5 mols of formaldehyde per mol of rosin and from about 1% to about 33% by weight of said maleic anhydride based on the combined weight of said rosin and said formaldehyde, and then heating the mixture to a temperature of from about 100° C. to about 290° C. until water and said solvent have been removed.

16. As a new article of manufacture, a conjoint condensation product of the simultaneous reaction of a mixture of reactants which consist essentially of about 100 parts of an unsaturated rosin acid, about 9.38 parts of formaldehyde, and from 5.4 to 10.9 parts of maleic anhydride.

PAUL H. SCRUTCHFIELD.